US012632795B2

(12) United States Patent
Verma et al.

(10) Patent No.: US 12,632,795 B2
(45) Date of Patent: May 19, 2026

(54) DATA SUBSET SELECTION FOR FEDERATED LEARNING

(71) Applicant: International Business Machines Corporation, Armonk, NY (US)

(72) Inventors: Dinesh C. Verma, New Castle, NY (US); Supriyo Chakraborty, White Plains, NY (US); Shiqiang Wang, White Plains, NY (US); Augusto Vega, Poway, CA (US); Hazar Yueksel, San Francisco, CA (US); Ashish Verma, Nanuet, NY (US); Pradip Bose, Yorktown Heights, NY (US); Jayaram Kallapalayam Radhakrishnan, Pleasantville, NY (US)

(73) Assignee: International Business Machines Corporation, Armonk, NY (US)

( * ) Notice: Subject to any disclaimer, the term of this patent is extended or adjusted under 35 U.S.C. 154(b) by 1097 days.

(21) Appl. No.: 17/687,074

(22) Filed: Mar. 4, 2022

(65) Prior Publication Data

US 2023/0281518 A1     Sep. 7, 2023

(51) Int. Cl.
*G06N 20/20*     (2019.01)
*G06N 3/045*     (2023.01)
*G06N 3/098*     (2023.01)

(52) U.S. Cl.
CPC ............. *G06N 20/20* (2019.01); *G06N 3/098* (2023.01); *G06N 3/045* (2023.01)

(58) Field of Classification Search
CPC ........ G06N 20/00; G06N 20/10; G06N 20/20; G06N 3/02; G06N 3/04; G06N 3/045;
(Continued)

(56) References Cited

U.S. PATENT DOCUMENTS 10,341,374 B1 *  7/2019  Sadaghiani ........... G06F 18/217
10,775,977 B2   9/2020  Sowden et al.
(Continued)

FOREIGN PATENT DOCUMENTS

CN     110995737 A     4/2020
CN     111241580 A     6/2020
(Continued)

OTHER PUBLICATIONS

Bonawitz et al., "Practical Secure Aggregation for Privacy-Preserving Machine Learning," Proceedings of the 2017 ACM SIGSAC Conference on Computer and Communications Security, Oct.-Nov. 2017, pp. 1175-1191.
(Continued)

*Primary Examiner* — Shane D Woolwine
(74) *Attorney, Agent, or Firm* — Scully, Scott, Murphy & Presser, P.C.; Andre L. Adkins

(57)     ABSTRACT

Second machine learning models trained using respective second data sets can be received. The second machine learning models can be run using a first data set used in training a first machine learning model, where the second machine learning models produce respective outputs. Scores associated with the second machine learning models can be determined by comparing the respective outputs with ground truth associated with the first data set. Based on the scores associated with the second machine learning models, whether the first data set is to be discarded or kept can be determined for training the first machine learning model.

20 Claims, 7 Drawing Sheets

(58) Field of Classification Search
CPC ........ G06N 3/08; G06N 3/088; G06N 3/0895; G06N 3/09; G06N 3/091; G06N 3/092; G06N 3/098; G06N 3/0985
See application file for complete search history.

(56) References Cited

U.S. PATENT DOCUMENTS

| | | | |
|---|---|---|---|
| 10,970,402 B2 | 4/2021 | Verma et al. | |
| 2020/0311615 A1* | 10/2020 | Jammalamadaka ... | G06N 20/20 |
| 2021/0073678 A1 | 3/2021 | Chu et al. | |
| 2021/0409197 A1 | 12/2021 | Baracaldo et al. | |
| 2022/0414464 A1* | 12/2022 | Krishnaswamy ........ | G06N 3/09 |
| 2023/0041015 A1* | 2/2023 | Chhibber .............. | G06N 20/00 |
| 2023/0259812 A1 | 8/2023 | Jagyasi et al. | |
| 2023/0396434 A1 | 12/2023 | Liu et al. | |
| 2024/0005216 A1 | 1/2024 | Radhakrishnan et al. | |

FOREIGN PATENT DOCUMENTS

| | | |
|---|---|---|
| CN | 112580821 A | 3/2021 |
| CN | 113837761 A | 12/2021 |
| EP | 4083868 A1 | 11/2022 |
| WO | 2021/082647 A1 | 5/2021 |
| WO | 2021/112831 A1 | 6/2021 |

OTHER PUBLICATIONS

Confidential Computing Consortium. "A Technical Analysis of Confidential Computing." Oct. 2021, v1.2. 18 pages.

Geiping et al. "Inverting Gradients—How easy is it to break privacy in federated learning?. " Advances in Neural Information Processing Systems 33 (2020): 16937-16947.

Kaissis et al. "End-to-end privacy preserving deep learning on multi-institutional medical imaging." Nature Machine Intelligence 3.6 (2021): 473-484.

Lai et al. "Oort: Efficient federated learning via guided participant selection." 15th {USENIX} Symposium on Operating Systems Design and Implementation ({OSDI} 21). 2021. 18 pages.

Melis et al. "Exploiting unintended feature leakage in collaborative learning." 2019 IEEE symposium on security and privacy (SP). IEEE, 2019. pp. 691-706.

Yang et al. "Federated Machine Learning: Concept and Applications." arXiv preprint arXiv:1902.04885 (2019): pp. 1-19.

Zhao et al. "iDLG: Improved deep leakage from gradients." arXiv preprint arXiv:2001.02610 (2020). 5 pages.

Zhu et al. "Deep leakage from gradients." 33rd Conference on Neural Information Processing Systems (NeurIPS 2019). 11 pages.

Anonymously, "Method and System for Reducing Communication Cost and Improving Local Model Accuracy in Federated Learning", An IP.com Prior Art Database Technical Disclosure, IP.com No. IPCOM000265654D, May 4, 2021, 6 pages.

Tuor, T., et al., "Overcoming Noisy and Irrelevant Data in Federated Learning", arXiv:2001.08300v2, Jun. 23, 2020, 8 pages.

Tuor, T., et al., "Data Selection for Federated Learning with Relevant and Irrelevant Data at Clients", arXiv:2001.08300v1, Jan. 22, 2020, 14 pages.

Lai, F., et al., "Oort: Efficient Federated Learning via Guided Participant Selection", 2020, 17 pages.

Bonawitz, K., et al., "Towards Federated Learning at Scale: System Design", Proceedings of the 2nd SysML Conference, Mar. 2019, 15 pages.

Bhagoji, A.N., et al., "Analyzing Federated Learning through an Adversarial Lens", Proceedings of the 36 th International Conference on Machine Learning, Jan. 2018, PMLR 97, 2019, 10 pages.

Grueneberg, K., et al., "A Policy-based Approach for Measuring Data Quality", 2019 IEEE International Conference on Big Data (Big Data), Dec. 2019, pp. 4026-4031.

Kang, J., et al., "Reliable Federated Learning for Mobile Networks", arXiv:1910.06837v1, Oct. 14, 2019, 8 pages.

Kang, J., et al., "Incentive Mechanism for Reliable Federated Learning: A Joint Optimization Approach to Combining Reputation and Contract Theory", IEEE Internet of Things Journal, Dec. 2019, 14 pages, vol. 6, Issue 6.

Verma, D., et al., "Self Generating Policies for Machine Learning in Coalition Environments", Policy-Based Autonomic Data Governance, 2019, pp. 42-65.

Verma, D., et al., "Managing Training Data from Untrusted Partners Using Self-generating Policies", Artificial Intelligence and Machine Learning for Multi-Domain Operations Applications, International Society for Optics and Photonics, 2019, 15 pages, vol. 11006.

NIST, "NIST Cloud Computing Program", http://csrc.nist.gov/groups/SNS/cloud-computing/index.html, Created Dec. 1, 2016, Updated Oct. 6, 2017, 9 pages.

Deng, et al., AUCTION: Automated and Quality-Aware Client Selection Framework for Efficient Federated Learning, IEEE Transactions On Parallel And Distributed Systems, Aug. 2022, vol. 33, No. 8, pp. 1996-2009.

Dong, et al., Offloading Federated Learning Task to Edge Computing with Trust Execution Environment, IEEE 17th International Conference on Mobile Ad Hoc and Sensor Systems (MASS), Dec. 10-13, 2020, pp. 491-496.

Fan, et al., Improving Fairness for Data Valuation in Horizontal Federated Learning, IEEE 38th International Conference on Data Engineering (ICDE), May 2022, pp. 2440-2453.

Kanagavelu, et al., Two-Phase Multi-Party Computation Enabled Privacy-Preserving Federated Learning, arXiv:2005.11901v1 [cs. DC], May 25, 2020, 11 pages.

Mondal, et al., Flatee: Federated Learning Across Trusted Execution Environments, arXiv:2111.06867v1 [cs. CR], Nov. 12, 2021, 8 pages.

Wang, et al., Measure Contribution of Participants in Federated Learning, arXiv: 1909.08525v1 [cs.LG], Sep. 17, 2019, 8 pages.

Zhao, et al., Efficient Client Contribution Evaluation for Horizontal Federated Learning, ICASSP 2021—2021 IEEE International Conference on Acoustics, Speech and Signal Processing (ICASSP), Feb. 26, 2021, 5 pages.

Kairouz et al. "Advances and Open Problems in Federated Learning", arXiv: 1912.04977v1 [cs.LG], Dec. 10, 2019, 105 pages.

Kuznetsov et al. "SecureFL: Privacy Preserving Federated Learning with SGX and TrustZone" 2021 IEEE/ACM Symposium on Edge Computing (SEC), Dec. 2021, 13 pages.

No Author. "Confidential Computing: Hardware-Based Trusted Execution for Applications and Data", Confidential Computing Consortium, Jan. 2021,15 pages.

* cited by examiner

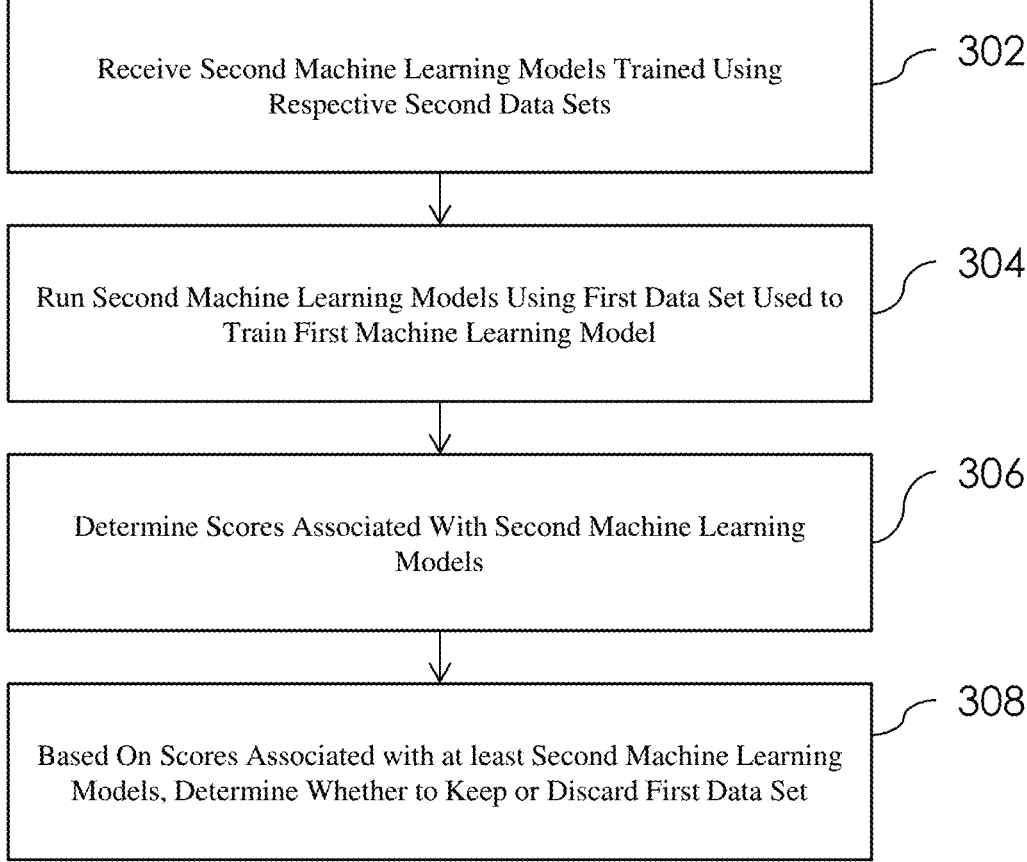

Receive Second Machine Learning Models Trained Using Respective Second Data Sets — 302

Run Second Machine Learning Models Using First Data Set Used to Train First Machine Learning Model — 304

Determine Scores Associated With Second Machine Learning Models — 306

Based On Scores Associated with at least Second Machine Learning Models, Determine Whether to Keep or Discard First Data Set — 308

FIG. 3

DATA SUBSET SELECTION FOR FEDERATED LEARNING

BACKGROUND

The present application relates generally to computers and computer applications, and more particularly to machine learning, federated learning and training data selection.

Federated learning techniques generally create shared artificial intelligence (AI) models from data which are maintained in a distributed manner at multiple sites without necessarily moving the data around to a central location. However, data maintained at different sites may have different quality characteristics, and different data segments at different locations may correspond to different quality segments. As a result, not all training data from every source ought to be used to create a shared model. In federated learning environment, however, it may be challenging to be able to select only components of data deemed to be good and reliable, for use in federated learning.

BRIEF SUMMARY

The summary of the disclosure is given to aid understanding of a computer system and method of selecting or generating training data for machine learning, and not with an intent to limit the disclosure or the invention. It should be understood that various aspects and features of the disclosure may advantageously be used separately in some instances, or in combination with other aspects and features of the disclosure in other instances. Accordingly, variations and modifications may be made to the computer system and/or their method of operation to achieve different effects.

A system, in an aspect, can include a processor. The system can also include a memory device coupled with the processor. The processor can be configured to receive second machine learning models trained using respective second data sets. The processor can also be configured to run the second machine learning models using a first data set used in training a first machine learning model, where the second machine learning models produce respective outputs. The processor can also be configured to determine scores associated with the second machine learning models by comparing the respective outputs with ground truth associated with the first data set. The processor can also be configured to, based on the scores associated with the second machine learning models, determine which training data in the first data set is to be discarded or kept for training the first machine learning model.

A computer-implemented method, in an aspect, can include receiving second machine learning models trained using respective second data sets. The computer-implemented method can also include running the second machine learning models using a first data set used in training a first machine learning model, where the second machine learning models produce respective outputs. The computer-implemented method can also include determining scores associated with the second machine learning models by comparing the respective outputs with ground truth associated with the first data set. The computer-implemented method can also include, based on the scores associated with the second machine learning models, determining which training data in the first data set is to be discarded or kept for training the first machine learning model.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

BRIEF DESCRIPTION OF THE DRAWINGS

FIG. 3 is a diagram illustrating a method of selecting training data in federated learning in an embodiment.

DETAILED DESCRIPTION

Figure 1:
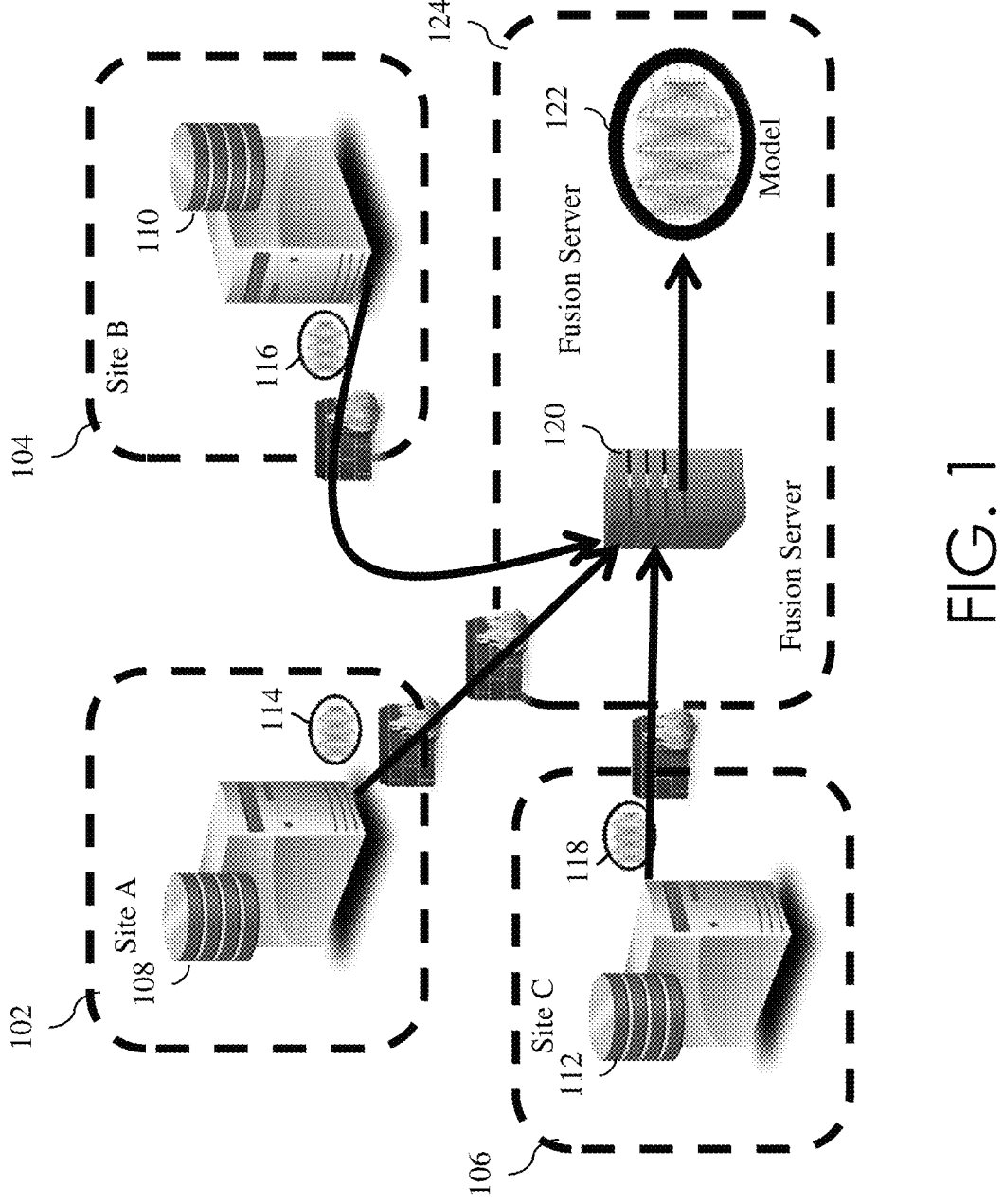
FIG. 1 is a diagram illustrating a computing environment in an embodiment.

Federated learning technology or technique allows models to be trained independently and then combined together. As one example, models can be developed for enterprise context with a few (e.g., <100) sites/departments/organizations where sizeable data reside. In another example, models can be developed for consumer context where there can be large numbers (e.g., millions or thousands) of sites (e.g., mobile phones) with a common application.

Data selection challenges in federated learning can exist. For example, data can be maintained at each agent (e.g., computer) with different constraints and quality management processes. It may not be desirable to use all data at every site for federated learning (e.g., due to some data, which may present quality issues). Some data may be mislabeled in classification problems. Some data points may have disagreement or conflict with data maintained at other places. Some data may have an erroneous element making it an outlier. Thus, determining how to select only the subset of data at each agent that is "good" for federated model building can pose a challenge. It may be that while each agent believes its data is maintained as per the best quality feasible, and has run local data quality checks, data quality or abnormality may only become visible when compared with data from other agents.

A model can be a representation of a function encoded by the training data. Considering that each agent has the best possible quality of data the respective agent can manage on its own, the agents can compare the local model of each agent as a proxy for the training data. Agreement among models can be used to check if data points are part of the consensus among different agents or not. It may be that not all agents equally treat or manage their data quality, and so all agents may not be treated equally with respect to their checking for model agreement. In an embodiment, the models of the agents can be run on other data sets to obtain an agreement score. Using the agreement score, a weighted ensemble can be created. Only a subset of training data where the ground truth labels match the prediction of the ensemble can be selected to train the federated learning model.

In an embodiment, a system and/or method creates an agreement matrix or like data structure, which measures how similar the data maintained at different agents is. The agreement matrix can be calculated by having an initial exchange of local models that are trained completely independently by all of the agents. Each agent then checks each element of its training data set against the models provided by the other agents. An agreement score, which measures how the model provided by each agent compares with those of other agent, can be computed for each agent locally, and averaged or combined over all the agents to get the agreement matrix. This agreement score provides a weight for an ensemble of individual models to score each of the data points. Each agent may remove the data points whose labels do not correspond to the agreement score, and only use data points locally present that agree with the ensemble to be used for federated learning. This methodology can eliminate data points maintained at an agent that are likely to be in disagreement with a majority of the other agents. The majority can be a configured number, for example, over 50%, or over a predefined number or percentage of agents.

In an embodiment, the methodology can be applicable in an environment where data is located at N different sites (e.g., fusion client sites). FIG. 1 is a diagram illustrating a computing environment in an embodiment. The components shown can include computer-implemented components, for instance, implemented and/or run on one or more hardware processors, or coupled with one or more hardware processors. One or more hardware processors, for example, may include components such as programmable logic devices, microcontrollers, memory devices, and/or other hardware components, which may be configured to perform respective tasks described in the present disclosure. Coupled memory devices may be configured to selectively store instructions executable by one or more hardware processors.

A processor may be a central processing unit (CPU), a graphics processing unit (GPU), a field programmable gate array (FPGA), an application specific integrated circuit (ASIC), another suitable processing component or device, or one or more combinations thereof. The processor may be coupled with a memory device. The memory device may include random access memory (RAM), read-only memory (ROM) or another memory device, and may store data and/or processor instructions for implementing various functionalities associated with the methods and/or systems described herein. The processor may execute computer instructions stored in the memory or received from another computer device or medium.

In an embodiment, a site (e.g., 102, 104, 106) can be a data center or have a data center. The sites can be data centers of one entity, which are distributed geographically. In another embodiment, each or some of the sites can belong to different entities, but may be using shared trained models or algorithms in performing a function (e.g., anomaly detection, prediction, etc.) used by those different entities. Each site 102, 104, 106 can have data 108, 110, 112 that is maintained, for example, in a schema. For example, a site 102 maintains and/or keeps its own data set 108; a site 104 maintains and/or keeps its own data set 110; a site 106 maintains and/or keeps its own data set 112. The sites do not share their data, or the data are not moved around among the sites. In an embodiment, each site 102, 104, 106 maintains data according to a consistent data schema. In an embodiment, each site 102, 104, 106 also can trains its own artificial intelligence (AI) model 114, 116, 118, for example, based on the data it maintains 108, 110, 112. An artificial intelligence (AI) model fusion process can be enabled by means of another server, e.g., a fusion server 120, for example, at a site 124. Such fusion server or another server 120 can be another third party entity, or belong to the same entity of any one of the sites 102, 104, 106. For instance, the fusion server 102 be located at any one of the sites, e.g., 102, 104, 106, 124. The fusion server 120 may compute an AI model M 122, which can be done without moving all of the data to the fusion server. For example, in federated learning, in an embodiment, each site can train its own model based on its local data, then the various models of the sites can be combined at a central server such as the fusion server 120 to result in an ensemble model 122. For instance, a model can be a neural network with parameters or weights, which each of the agents or sites can provide to the central server. The central server can combine the parameters to build a combined model. Combination technique can include averaging the parameters or weights or another manner of aggregating the parameters or weights. In an embodiment, a server that combines the models (e.g., builds an ensemble model) can be operated, managed, owned or maintained by a different entity or the same entity as one or more of the individual entities that train their models individually.

The sites 102, 104, 106, 124 can have sets of general purpose processors, e.g., central processing units (CPUs) augmented with graphical processing units (GPUs) that can help in the process of training and inference (e.g., classification). Special processors for power performance can also exist on each of the sites.

Figure 2:
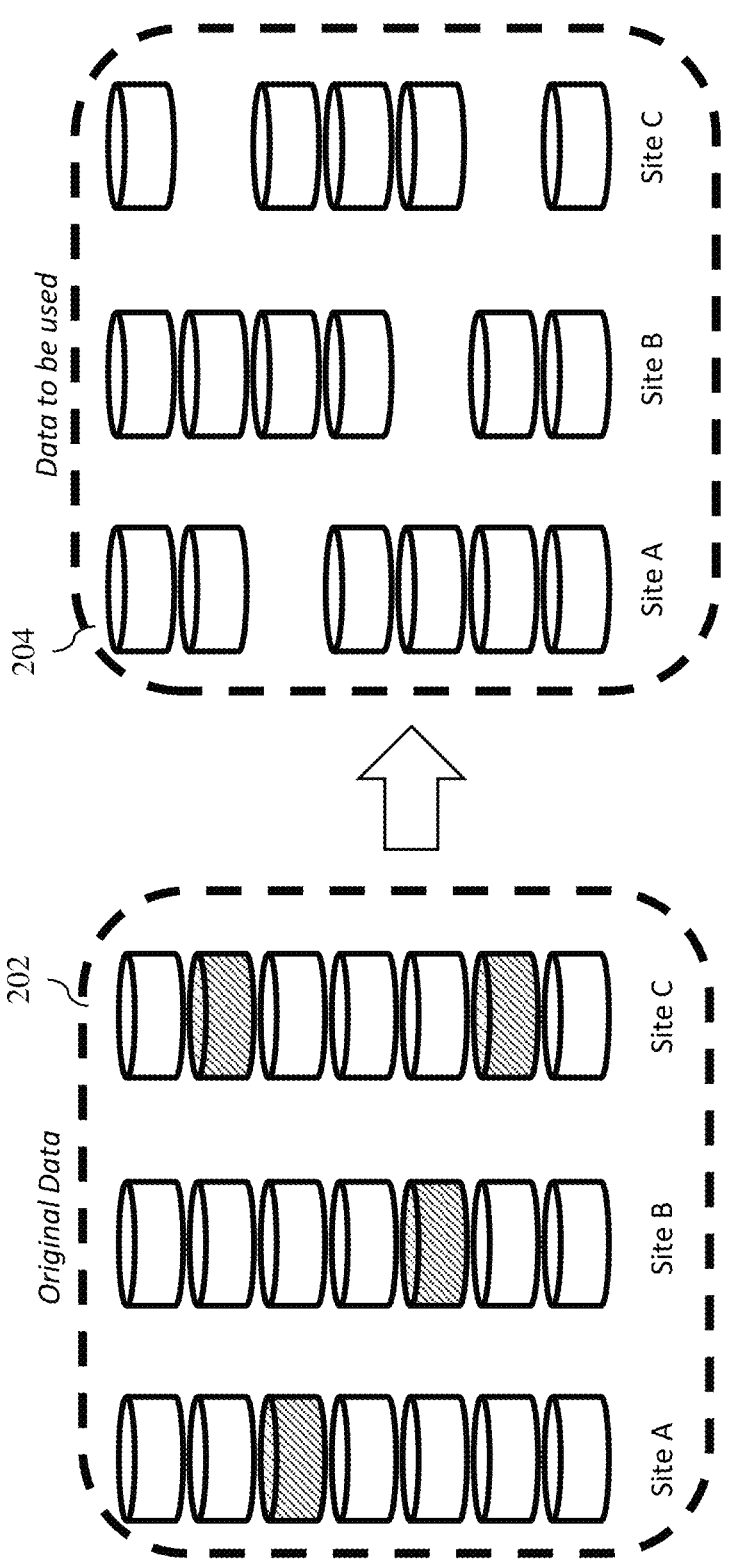
FIG. 2 illustrates data maintained by at different sites in an embodiment.

In federated learning, the data that is provided by each of the agents (e.g., a computer implemented module at computer or server site) can be used to train a model. However, it may be that some data points at an agent may not have good enough quality, may be mislabeled, or may have other issues, in which case not all the data at every agent should be used for the model building. The system and/or method may address determining how to remove such "unwanted portions" of training data without consolidating all of the training data, for example, without having to move the data around between or among agents. In an embodiment, an agent or site does not need to share its data with another agent, for determining what data to remove from the training set. For instance, while an agent may not be capable of recognizing and removing any part of its data since an agent would already have collected the data in good faith using the best possible available mechanisms, and discovering the unwanted data may need considering the entirety of every other site's data, according to an embodiment of a methodology disclosed herein, an agent still would not need to share its data with another agent in determining what data to not use (or discard) in training its model. FIG. 2 illustrates data maintained by at different sites in an embodiment. Each agent at a site may be using its local data at the site to train its model such as a neural network, deep learning neural network, or another AI model. Consider, however, that some sites have data which do not meet the quality threshold (e.g., shown at 202 as patterned objects), albeit unknown to those individual sites using the data. The system and/or method in one or more embodiments can remove such data from the training data (e.g., as shown at 204) for training a model or models.

Consider that the data that is being collected is in the same format at each of the sites, for example, each site has a set of images that are collected in the ".jpeg" format with the same resolution, or that each site has a set of audio files in the same format, or that each of them have data that is using the same schema. Similarly, consider that all the labels for classification type problems are consistent and common across all sites.

Referring to FIG. 1, initially, the agents (e.g., at 102, 104, 106) may be training their local models (e.g., 114, 116, 118) and exchanging the models with each other. Each agent calculates the predictions of the other agent's model on their data, thereby calculating a column of the agreement matrix. The agents can then exchange their information providing each agent with the complete agreement matrix. This exchange can be facilitated by a server (e.g., a fusion server) 120.

Once the agreement matrix is known to all of the agents, each agent can create an ensemble in which the predictions of the local model of any agent is weighted by the average agreement score of the agent model with other data. Each agent can compare each data point in its training data set with the ensemble model, and determine the difference to decide whether or not to include that data point in the training data set used to create a model via federated learning. In another embodiment, each agent can provide the information (e.g., agreement matrix) to another server, for example, a fusion server, where the fusion server uses the information to build such weighted ensemble model. The fusion server may communicate or transmit the ensemble model to the agents for the agents to use.

For example, a computer processor can compute an agreement matrix among the different agents. Such computer processor can be a processor running on the fusion server (e.g., 120) or another server. An example of an agreement matrix is shown as follows.

|  | Agent 0 | Agent 1 | Agent 2 | Agent 3 |
|---|---|---|---|---|
| Agent 0 |  | 65% | 34% | 89% |
| Agent 1 | 70% |  | 40% | 90% |
| Agent 2 | 34% | 45% |  | 40% |
| Agent 3 | 95% | 80% | 50% |  |

The matrix can have i rows and j columns. The rows represent data sets of respective agents. The columns represent models of respective agents. An entry j, i can measure how often a model from agent j can provide the correct or right prediction on data set of agent i. Average of rows measures how often an agent model gives right prediction on other agent's data. The measure may be weighted by data size. Average of columns measures how the agent data matches average prediction from the other models. The average (or another combination technique) of both can provide a measure of the "match" of data/model at an agent, which can be viewed as agent reputation.

For instance, referring to the example agents referred to in the above example agreement matrix, the "Agent 0" row heading shows the results of running Agent 0's data against, or on, the AI models of "Agent 1" (shown as 65% in Agent 1 column heading), "Agent 2" (shown as 34% in Agent 2 column heading) and "Agent 3" (shown as 89% in Agent 3 column heading). For example, Agent 0 runs the models of Agent 1, Agent 2, and Agent 3, on the local site of Agent 0 using Agent 0's data points or data set.

The "Agent 1" row heading shows the results of running Agent 1's data against, or on, the AI models of "Agent 0" (shown as 70% in Agent 0 column heading), "Agent 2" (shown as 40% in Agent 2 column heading) and "Agent 3" (shown as 90% in Agent 3 column heading). For example, Agent 1 runs the models of Agent 0, Agent 2, and Agent 3, on the local site of Agent 1 using Agent 1's data points or data set.

The "Agent 2" row heading shows the results of running Agent 2's data against, or on, the AI models of "Agent 0" (shown as 34% in Agent 0 column heading), "Agent 1" (shown as 45% in Agent 1 column heading) and "Agent 3" (shown as 40% in Agent 3 column heading). For example, Agent 2 runs the models of Agent 0, Agent 1, and Agent 3, on the local site of Agent 2 using Agent 2's data points or data set.

The "Agent 3" row heading shows the results of running Agent 3's data against, or on, the AI models of "Agent 0" (shown as 95% in Agent 0 column heading), "Agent 1" (shown as 80% in Agent 1 column heading) and "Agent 2" (shown as 50% in Agent 2 column heading). For example, Agent 3 runs the models of Agent 0, Agent 1, and Agent 2, on the local site of Agent 3 using Agent 3's data points or data set. In an embodiment, a metric for scoring or evaluating a model can use F-scores used in statistical analysis to determine how well a model performs on any piece of data.

In one or more embodiments, different policies can be used to determine whether a training data point should be discarded or used. For instance, if a threshold number of models from different agents produce a score above a threshold score for a given data point, then it may be considered that the data point is good and should be kept as training data, otherwise the data point may be discarded. As another example, if a threshold number of models from different agents produce a score below a threshold score for a given data point, then it may be considered that the given data point should be discarded. In an embodiment, the data point that is tested or run can be in groups, for example, a group or cluster of data points. In this way, an agent can determine the agent's data quality based on running other agents' models on the agent's data, e.g., without having to know of, or having, other agents' data. In an embodiment, the agreement matrix can be shared communicated among the agents. For example, Agent 0 may share the information in the row of Agent 0 (in the above agreement matrix) with other agents, and so forth. In another embodiment, the agreement matrix can be ensembled by a central server or a fusion server responsive to receiving the information from all the agents.

In an embodiment, once agents have been assigned a reputation, a weighted ensemble of their models can be created (e.g., based on their reputation or prediction accuracy). In an embodiment, in creating the weighted ensemble, the models which produced low accuracy results across other agents' data sets or data points can also be discarded or weighted low. For instance, considering the agreement matrix shown above, a model that produces a score below a threshold score in a threshold number of other agents' dataset can be considered as being an inaccurate model, and that model may be discarded when creating the weighted ensemble (or combined model). The weighted ensemble can be used to determine whether a data point in the training set matches the others or not. Data points which do not match the ensemble prediction can be dropped. In an embodiment, for classification models that produce classes as outputs, the matching can match classes. In another embodiment, matching can be determined by computing distances between predictions for models with numeric output.

In an embodiment, a system and/or method can compare how each data point compares to the data at other agents. Each agent can learn an independent local model. Models can be exchanged with all of the other agents. Each agent can compare its model with that provided by other agents. Each agent can be assigned a score locally which compares its agreement with other agents. An agent agreement matrix can be computed. A fusion server or another server can average agent agreement matrix across all the agents. Each agent can assign a weight to other agents. Such weight can be used as an ensemble mechanism to classify data as per other models. Data can be classified as per the ensemble weights. Data that has a high difference from the ensemble model can be discarded.

In an embodiment, the agents can learn and exchange local models, exchange agreement matrix and compute agent reputation. Based on the agreement matrix and/or the agent reputation, an ensemble weights can be computed, which combines the models of the agents based on the agreement matrix and/or the agent reputation. For instance, agent models with weak reputation can be discarded or weighted less when combining the models. The combined model (or weighted ensemble) can be shared among the agents (or sent to the agents). Each agent them may perform prediction (run the combined model) using its data. Based on the result of running the combined model on its data, the data (considered ground truth data) that match the output produced by the combined model can be kept or selected, those that do not match can be discarded.

In another embodiment, the agreement matrix may be obtained by checking each of the models on a reference set of data. The reference set of data may be maintained at a special site, e.g., a server (e.g., a fusion server) or the reference set of data may be built by selecting a subset of data points from each of the sites.

In another embodiment, the ensemble can be built only over a predetermined portion (e.g., small portion) of the training data, allowing for faster computation of the ensemble. Once the ensemble has been created, then selected data points for a larger set of data can be used to train a federated learning model. In such cases, the ensemble can also be built up in an iterative manner, with each iteration looking at a randomly selected subset of training data at each site.

In another embodiment, a set of rules or policies may be defined apriori which assign different levels of trust or thresholds to different agents. A policy may mark some agents as having more reliable data and agreement with them is considered more important than that of others. The threshold on which the data from different agents are accepted or rejected can also be determined by means of one or more externally specified policies or preconfigured policies.

A method, for example, can select a subset of training data for creating a model which is available from many different data sets. The method can include training independent local models for each data set, running the models on other data sets to get an agreement score, using the agreement score to create a weighted ensemble, and/or selecting the subset of training data which matches the prediction of the ensemble. Different methods can be used to compute agreement scores, and to define distance on the predictions.

FIG. 3 is a diagram illustrating a method in one embodiment, The method can select training data in federated learning in an embodiment. At 302, second machine learning models trained using respective second data sets can be received. For example, each of the second machine learning model trains on its own second data set. In an embodiment, each of the second data sets are different from one another. For instance, there are different data points in the second data sets.

At 304, the second machine learning models are run using a first data set used in training a first machine learning model, where the second machine learning models produces respective outputs. For example, the first machine learning model and the second machine learning models can be distributed across different computer systems, where the first machine learning model can be trained using the first data set independently from the second machine learning models. In an embodiment, the first machine learning model and the second machine learning models can be located in different geographic locations. In an embodiment, the first machine learning model can be trained on the first data set, each of the second machine learning models can be trained on its own second data set. The first data set and each of the second data sets are not shared among the first machine learning model and the second machine learning models or among the sites running the first machine learning model and the second machine learning models. In an embodiment, the first machine learning model and the second machine learning models can include, but are not limited to, neural networks, deep learning neural networks, and/or other machine learning models, which can be supervised machine learning models, unsupervised machine learning models, semi-supervised machine learning models, and/or others.

At 306, scores associated with the second machine learning models can be determined by comparing the respective outputs with ground truth associated with the first data set. For example, the prediction or output data of a second machine learning model can be compared to the ground truth data associated with the first data set, and determine how accurately the second machine learning model performed on the first data set. This can be done for each of the second machine learning models. A score can be computed using one or more methods, such as the percentage of accurate predictions output by the second machine learning model, and/or another method.

At 308, based on the scores associated with the second machine learning models, whether the first data set is to be discarded or kept can be determined for training the first machine learning model. For example, which training data in the first data set is to be discarded or kept for training the first machine learning model can be determined. In an embodiment, if a threshold number of second machine learning models produce outputs that match the first data set (e.g., the first data set's ground truth), it can be determined to keep the first data set as being of quality data as training data. The threshold number can be configurable. In an embodiment, for a classification problem, an output or predicted output class can be compared with the ground truth class. In an embodiment, a distance can be computed between a prediction output with numeric output. In an embodiment, "matching" of an output of a second machine learning model need not be exact match, but can be in a range of similarity, for example, a close match (e.g., based on a threshold value specifying the closeness, which can be configurable). In an embodiment, the second machine learning models can be weighted based on the scores associated with the second machine learning models.

In an embodiment, an ensemble model can be built based on at least the scores associated with the second machine learning models, where whether the first data set is to be discarded or kept for training the first machine learning model is determined by running the ensemble model using the first data set and comparing an output of the ensemble model with the ground truth associated with the first data set.

In an embodiment, an ensemble model built based on at least the scores associated with the second machine learning models can be received. In an embodiment, an entity that builds the ensemble model can also receive a score associated with the first machine learning model from the second machine learning models and use the scores associated with the second machine learning models and the first machine learning model to build the ensemble model. The ensemble model can be considered as weighted ensemble model, for example, with the ensemble model being built based on the accuracy weights associated with the second machine learning model and the first machine learning model. For example, the ensemble model combines the parameters and/or weights (e.g., neural network neuron or node weights) of the first machine learning model and the second machine learning model. The ensemble model can be run using the first data set. The first data set having ground truth that matches with an output of the ensemble model can be selected or kept, for example, as training data for the first machine learning model.

In an embodiment, the first machine learning model can be trained using the first data set determined to be kept. In an embodiment, the first machine learning model trained using the first data set can be exchanged with a plurality of sites respectively running the second machine learning models.

Figure 4:
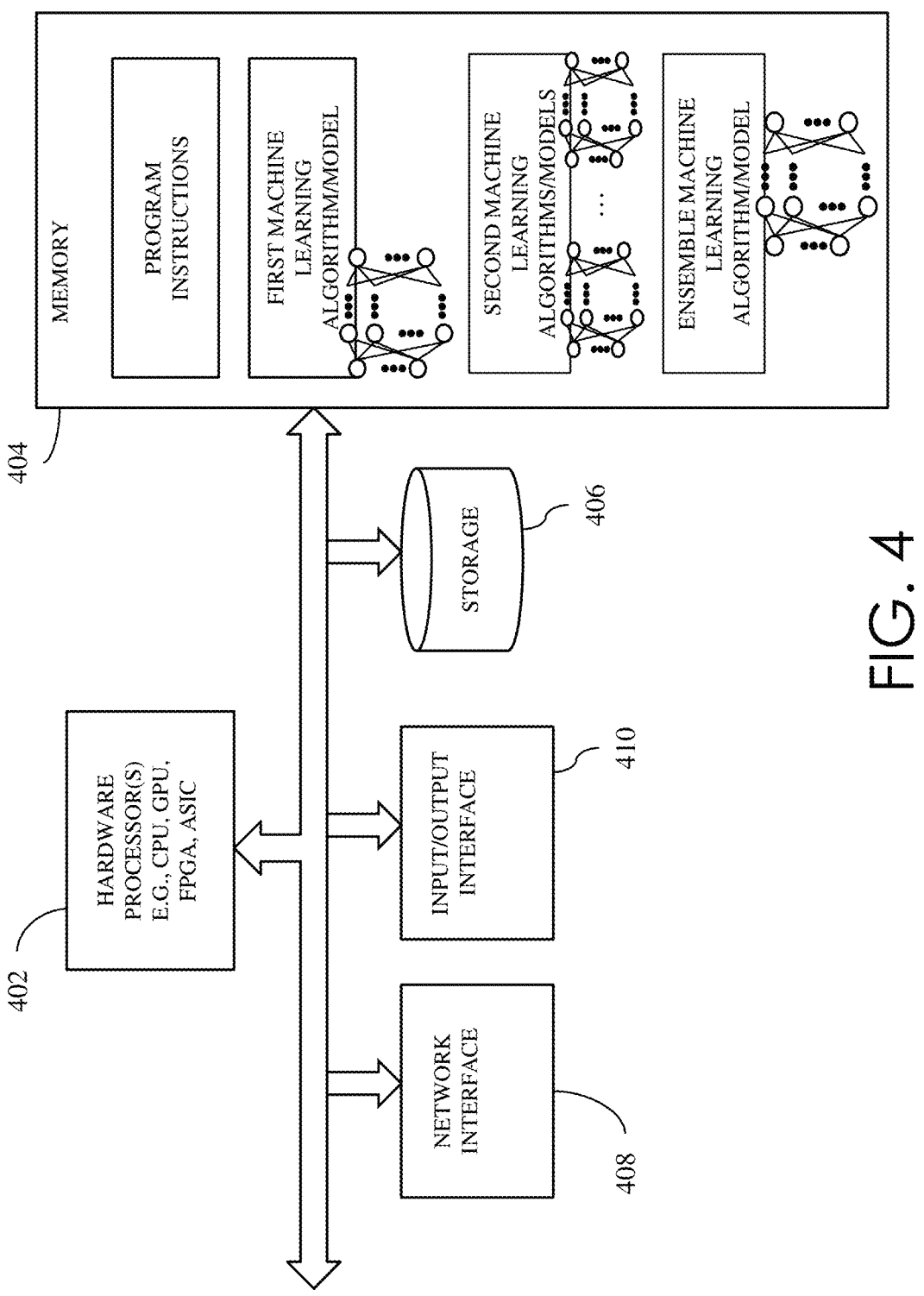
FIG. 4 is a diagram showing components of a system in one embodiment that determines or selects training data for training a machine learning model.

FIG. 4 is a diagram showing components of a system in one embodiment that determines or selects training data for training a machine learning model. One or more hardware processors 402 such as a central processing unit (CPU), a graphic process unit (GPU), and/or a Field Programmable Gate Array (FPGA), an application specific integrated circuit (ASIC), and/or another processor, may be coupled with a memory device 404, and generate a prediction model and recommend communication opportunities. A memory device 404 may include random access memory (RAM), read-only memory (ROM) or another memory device, and may store data and/or processor instructions for implementing various functionalities associated with the methods and/or systems described herein. One or more processors 402 may execute computer instructions stored in memory 404 or received from another computer device or medium. A memory device 404 may, for example, store instructions and/or data for functioning of one or more hardware processors 402, and may include an operating system and other program of instructions and/or data. One or more hardware processors 402 may receive input, which may include second machine learning models trained using respective second data sets. At least one hardware processor 402 may run the second machine learning models using a first data set used in training a first machine learning model, where the second machine learning models produce respective outputs. For example, each of the second machine learning model can be run and each outputs a prediction associated with the first data set. At least one hardware processor 402 may determine scores associated with the second machine learning models by comparing the respective outputs with ground truth associated with the first data set. Based on the scores associated with the second machine learning models, at least one hardware processor 402 may determine whether the first data set is to be discarded or kept for training the first machine learning model. In an embodiment, data can be removed which has poor quality or may be mislabeled, but without moving all the data to a centralized data curator. Similarly, in an embodiment, a model with accuracy prediction that does not meet a threshold quality (e.g., according to an agreement with other models) can be discarded. In an embodiment, input data may be stored in a storage device 406 or received via a network interface 408 from a remote device, and may be temporarily loaded into a memory device 404 for one or more processors 402 to use. One or more hardware processors 402 may be coupled with interface devices such as a network interface 408 for communicating with remote systems, for example, via a network, and an input/output interface 410 for communicating with input and/or output devices such as a keyboard, mouse, display, and/or others.

Figure 5:
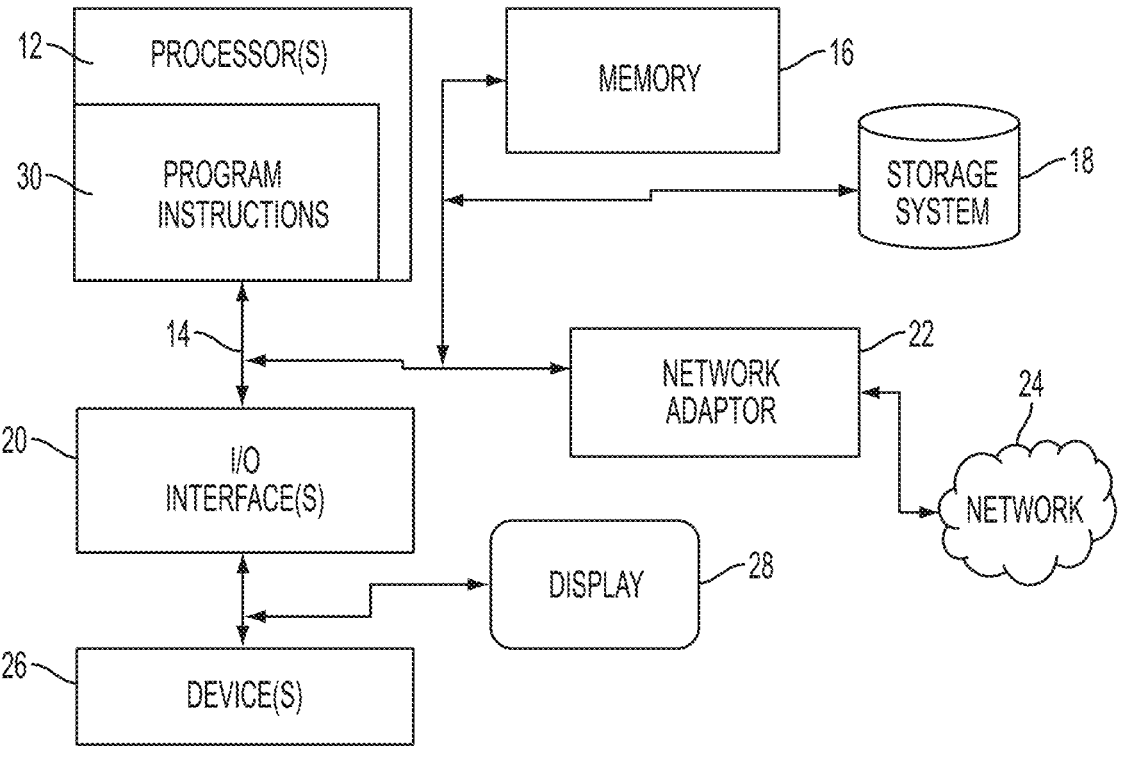
FIG. 5 illustrates a schematic of an example computer or processing system that may implement a system in one embodiment.

FIG. 5 illustrates a schematic of an example computer or processing system that may implement a system in one embodiment. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 5 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being run by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a module 30 that performs the methods described herein. The module 30 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others.

Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

It is understood in advance that although this disclosure may include a description on cloud computing, implementation of the teachings recited herein are not limited to a cloud computing environment. Rather, embodiments of the present invention are capable of being implemented in conjunction with any other type of computing environment now known or later developed. Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
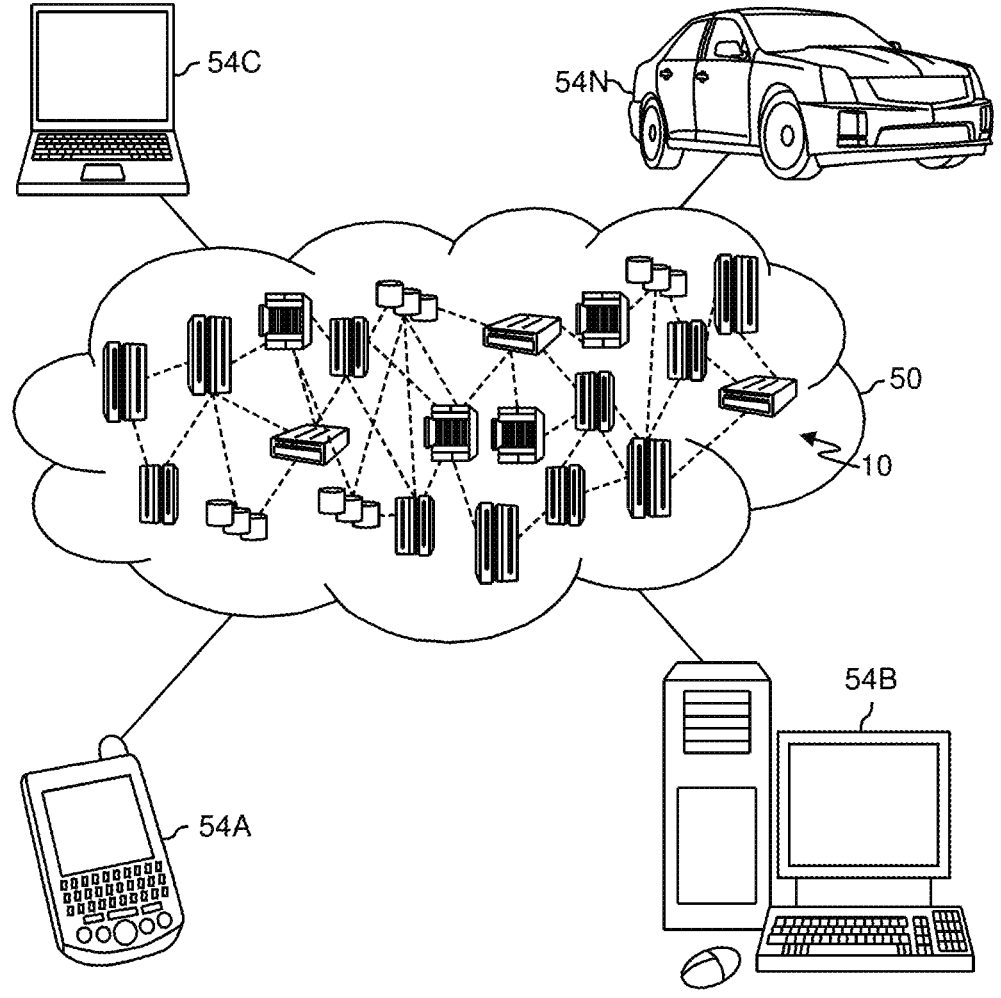
FIG. 6 illustrates a cloud computing environment in one embodiment.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
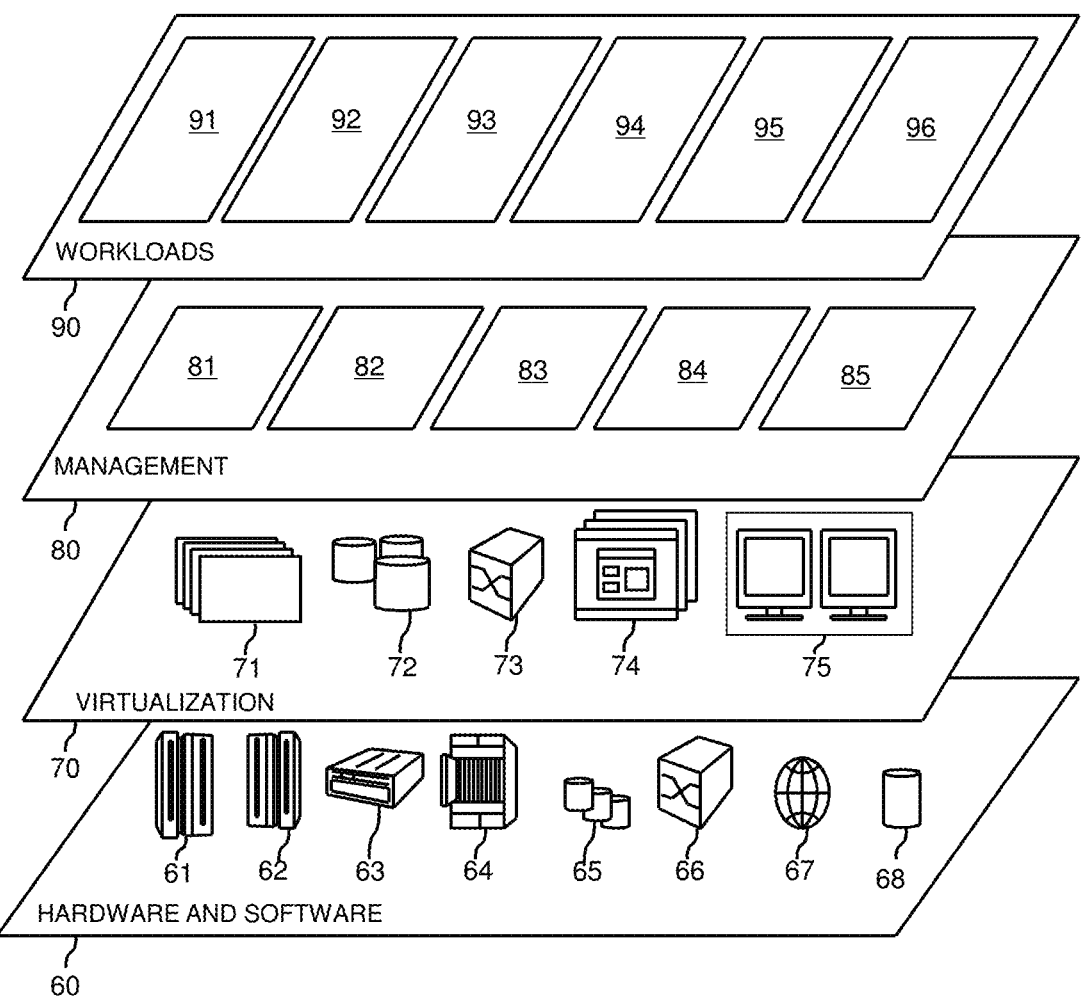
FIG. 7 illustrates a set of functional abstraction layers provided by cloud computing environment in one embodiment of the present disclosure.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and training data determination in federated learning processing 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, run concurrently, substantially concurrently, in a partially or wholly temporally overlapping manner, or the blocks may sometimes be run in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. As used herein, the term "or" is an inclusive operator and can mean "and/or", unless the context explicitly or clearly indicates otherwise. It will be further understood that the terms "comprise", "comprises", "comprising", "include", "includes", "including", and/or "having," when used herein, can specify the presence of stated features, integers, steps, operations, elements, and/or components, but do not preclude the presence or addition of one or more other features, integers, steps, operations, elements, components, and/or groups thereof. As used herein, the phrase "in an embodiment" does not necessarily refer to the same embodiment, although it may. As used herein, the phrase "in one embodiment" does not necessarily refer to the same embodiment, although it may. As used herein, the phrase "in another embodiment" does not necessarily refer to a different embodiment, although it may. Further, embodiments and/or components of embodiments can be freely combined with each other unless they are mutually exclusive.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A system comprising:

a processor; and a memory device coupled with the processor;

the processor configured to:

receive second machine learning models trained using respective second data sets;

run the second machine learning models using a first data set which was used in training a first machine learning model, the second machine learning models producing respective outputs;

determine scores associated with the second machine learning models by comparing the respective outputs with ground truth associated with the first data set, wherein each of the scores indicates how often a respective second machine learning model provides a right prediction using the first data set, in predicting an outcome the second machine learning models and the first machine learning model have been trained to predict;

based on the scores associated with the second machine learning models, determine which training data in the first data set is to be discarded or kept for training the first machine learning model, wherein the first machine learning model checks the first data set using each of the second machine learning models, and each of the first data set and the respective second data sets has different data quality; and sharing the scores with processors that run the second machine learning models without sharing the first data set used in training the first machine learning model with the second machine learning models.

2. The system of claim 1, wherein the first machine learning model and the second machine learning models are distributed across different computer systems and the first machine learning model is trained independently from the second machine learning models, wherein the first data set and the respective second data sets are unshared among the different computer systems.

3. The system of claim 1, wherein an ensemble model is built based on at least the scores associated with the second machine learning models, wherein which training data in the first data set is to be discarded or kept for training the first machine learning model is determined by running the ensemble model using the first data set and comparing an output of the ensemble model with the ground truth associated with the first data set.

4. The system of claim 1, wherein the processor is further configured to receive an ensemble model built based on at least the scores associated with the second machine learning models, run the ensemble model using the first data set, and select the training data from the first data set having ground truth that matches with an output of the ensemble model.

5. The system of claim 1, wherein the second machine learning models are weighted based on the scores associated with the second machine learning models.

6. The system of claim 1, wherein the processor is further configured to train the first machine learning model using the training data in the first data set determined to be kept.

7. The system of claim 1, wherein the processor is further configured to exchange the first machine learning model trained using the first data set with a plurality of sites running the second machine learning models.

8. A computer-implemented method comprising:

receiving second machine learning models trained using respective second data sets;

running the second machine learning models using a first data set which was used in training a first machine learning model, the second machine learning models producing respective outputs;

determining scores associated with the second machine learning models by comparing the respective outputs with ground truth associated with the first data set, wherein each of the scores indicates how often a respective second machine learning model provides a right prediction using the first data set, in predicting an outcome the second machine learning models and the first machine learning model have been trained to predict;

based on the scores associated with the second machine learning models, determining which training data in the first data set is to be discarded or kept for training the first machine learning model, wherein the first machine learning model checks the first data set using each of the second machine learning models, and each of the first data set and the respective second data sets has different data quality; and sharing the scores with processors that run the second machine learning models without sharing the first data set used in training the first machine learning model with the second machine learning models.

9. The computer-implemented method of claim 8, wherein the first machine learning model and the second machine learning models are distributed across different computer systems and the first machine learning model is trained independently from the second machine learning models, wherein the first data set and the respective second data sets are unshared among the different computer systems.

10. The computer-implemented method of claim 8, wherein an ensemble model is built based on at least the scores associated with the second machine learning models, wherein which training data in the first data set is to be discarded or kept for training the first machine learning model is determined by running the ensemble model using the first data set and comparing an output of the ensemble model with the ground truth associated with the first data set.

11. The computer-implemented method of claim 8, wherein the method further includes receiving an ensemble model built based on at least the scores associated with the second machine learning models, running the ensemble model using the first data set, and selecting the training data in the first data set having ground truth that matches with an output of the ensemble model.

12. The computer-implemented method of claim 8, wherein the second machine learning models are weighted based on the scores associated with the second machine learning models.

13. The computer-implemented method of claim 8, wherein the method further includes training the first machine learning model using the training data in first data set determined to be kept.

14. The computer-implemented method of claim 8, wherein the method further includes exchanging the first machine learning model trained using the first data set with a plurality of sites respectively running the second machine learning models.

15. A computer program product comprising a computer readable storage medium having program instructions embodied therewith, the program instructions readable by a device to cause the device to:

receive second machine learning models trained using respective second data sets;

run the second machine learning models using a first data set which was used in training a first machine learning model, the second machine learning models producing respective outputs;

determine scores associated with the second machine learning models by comparing the respective outputs with ground truth associated with the first data set, wherein each of the scores indicates how often a respective second machine learning model provides a right prediction using the first data set, in predicting an outcome the second machine learning models and the first machine learning model have been trained to predict;

based on the scores associated with the second machine learning models, determine which training data in the first data set is to be discarded or kept for training the first machine learning model, wherein the first machine learning model checks the first data set using each of the second machine learning models, and each of the first data set and the respective second data sets has different data quality; and sharing the scores with processors that run the second machine learning models without sharing the first data set used in training the first machine learning model with the second machine learning models.

16. The computer program product of claim 15, wherein the first machine learning model and the second machine learning models are distributed across different computer systems and the first machine learning model is trained independently from the second machine learning models, wherein the first data set and the respective second data sets are unshared among the different computer systems.

17. The computer program product of claim 15, wherein an ensemble model is built based on at least the scores associated with the second machine learning models, wherein which training data in the first data set is to be discarded or kept for training the first machine learning model is determined by running the ensemble model using the first data set and comparing an output of the ensemble model with the ground truth associated with the first data set.

18. The computer program product of claim 15, wherein the device is further caused to receive an ensemble model built based on at least the scores associated with the second machine learning models, run the ensemble model using the first data set, and select the training data from the first data set having ground truth that matches with an output of the ensemble model.

19. The computer program product of claim 15, wherein the second machine learning models are weighted based on the scores associated with the second machine learning models.

20. The computer program product of claim 15, wherein the device is further caused to train the first machine learning model using the training data in the first data set determined to be kept, and to exchange the first machine learning model trained with a plurality of sites respectively running the second machine learning models.

* * * * *